United States Patent
Joshi et al.

(10) Patent No.: US 10,885,363 B2
(45) Date of Patent: Jan. 5, 2021

(54) SPOOF DETECTION USING STRUCTURED LIGHT ILLUMINATION

(71) Applicant: Advanced New Technologies Co., Ltd., George Town (KY)

(72) Inventors: Yash Joshi, Kansas City, MO (US); Srikanth Parupati, Framingham, MA (US)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 111 days.

(21) Appl. No.: 16/171,029

(22) Filed: Oct. 25, 2018

(65) Prior Publication Data

US 2020/0134344 A1 Apr. 30, 2020

(51) Int. Cl.
| | |
|---|---|
| *G06K 9/00* | (2006.01) |
| *G06T 7/521* | (2017.01) |
| *G06N 20/00* | (2019.01) |
| *G06F 21/32* | (2013.01) |
| *G06T 5/10* | (2006.01) |

(52) U.S. Cl.
CPC ......... *G06K 9/00906* (2013.01); *G06F 21/32* (2013.01); *G06N 20/00* (2019.01); *G06T 5/10* (2013.01); *G06T 7/521* (2017.01); *G06T 2207/10048* (2013.01); *G06T 2207/20081* (2013.01)

(58) Field of Classification Search
CPC ....... G06K 9/00906; G06T 7/521; G06T 5/10; G06T 2207/10048; G06T 2207/20081; G06N 20/00; G06F 21/32
See application file for complete search history.

(56) References Cited

U.S. PATENT DOCUMENTS

| 9,390,327 B2 | 7/2016 | Gottemukkula et al. |
| 2004/0041997 A1* | 3/2004 | Uomori ................. G01S 7/4911 356/3.01 |

(Continued)

OTHER PUBLICATIONS

Sun et al., "TIR/VIS correlation for liveness detection in face recognition," 14th International Conference on Computer Analysis of Images and Patterns, Aug. 2011, 6855:114-121.

(Continued)

*Primary Examiner* — Khai M Nguyen
(74) *Attorney, Agent, or Firm* — Fish & Richardson P.C.

(57) ABSTRACT

The technology described in this document can be embodied in a method that includes a method for preventing access to a secure system based on determining a captured image to be of an alternative representation of a live person. The method includes illuminating a subject with structured light using a light source array comprising multiple light sources disposed in a predetermined pattern, capturing an image of the subject as illuminated by the structured light, and determining that the image includes features representative of the predetermined pattern. The method also includes, responsive to determining that the image includes features representative of the predetermined pattern, identifying the subject in the image to be an alternative representation of a live person. The method further includes responsive to identifying the subject in the image to be an alternative representation of a live person, preventing access to the secure system.

20 Claims, 6 Drawing Sheets

(56) References Cited

U.S. PATENT DOCUMENTS

| | | |
|---|---|---|
| 2004/0186363 A1 | 9/2004 | Smit et al. |
| 2005/0265585 A1 | 12/2005 | Rowe |
| 2007/0004972 A1 | 1/2007 | Cole et al. |
| 2008/0025579 A1 | 1/2008 | Sidlauskas et al. |
| 2016/0267339 A1 | 9/2016 | Nakano et al. |
| 2016/0335483 A1 | 11/2016 | Pfursich et al. |
| 2016/0371555 A1 | 12/2016 | Derakhshani et al. |
| 2017/0124374 A1 | 5/2017 | Rowe et al. |
| 2017/0286788 A1* | 10/2017 | Fan ................ G06K 9/00288 |
| 2017/0325721 A1* | 11/2017 | Matsuda .......... G06K 9/00013 |
| 2017/0344793 A1 | 11/2017 | Xue et al. |
| 2018/0053044 A1* | 2/2018 | Su ...................... G06T 7/0004 |
| 2018/0165512 A1 | 6/2018 | Fan |
| 2018/0181794 A1* | 6/2018 | Benini ............. G06K 9/00228 |
| 2018/0247142 A1* | 8/2018 | Oda ................... G06K 9/2027 |
| 2018/0285668 A1* | 10/2018 | Li ..................... G06K 9/6269 |
| 2018/0349721 A1* | 12/2018 | Agrawal ........... G06K 9/00617 |
| 2019/0025672 A1* | 1/2019 | Van Der Sijde ..... H04N 5/2256 |
| 2019/0068367 A1* | 2/2019 | Baughman .......... G06F 21/6245 |
| 2019/0278974 A1 | 9/2019 | Lubin et al. |
| 2020/0104567 A1* | 4/2020 | Tajbakhsh ............ G06K 9/6269 |
| 2020/0134242 A1 | 4/2020 | Parupati et al. |
| 2020/0134345 A1 | 4/2020 | Joshi et al. |
| 2020/0210738 A1 | 7/2020 | Parupati et al. |
| 2020/0250448 A1 | 8/2020 | Joshi et al. |

OTHER PUBLICATIONS

PCT International Search Report and Written Opinion in International Application No. PCT/US2019/058125, dated Feb. 5, 2020, 11 pages.

Zanuttigh et al., "Operating Principles of Structured Light Depth Cameras," Time-of-Flight and Structured Light Depth Cameras, Springer International Publishing, 2016, Chapter 2, DOI: 10.1007/978-3-319-30973-6_2, pp. 43-79.

* cited by examiner

SPOOF DETECTION USING STRUCTURED LIGHT ILLUMINATION

TECHNICAL FIELD

This disclosure relates to image capture devices.

BACKGROUND

Systems incorporating a biometric identification technology such as face recognition or iris recognition often include a camera that captures an image of a user. The captured image is then processed to authenticate the user using the biometric identification technology.

SUMMARY

In one aspect, this document features a method for preventing access to a secure system based on determining a captured image to be of an alternative representation of a live person. The method includes illuminating a subject with structured light using a light source array comprising multiple light sources disposed in a predetermined pattern, capturing an image of the subject as illuminated by the structured light, and determining that the image includes features representative of the predetermined pattern. The method also includes, responsive to determining that the image includes features representative of the predetermined pattern, identifying the subject in the image to be an alternative representation of a live person. The method further includes responsive to identifying the subject in the image to be an alternative representation of a live person, preventing access to the secure system.

In another aspect, this document features a secure system that includes an image acquisition device and an image analysis engine that includes one or more processing devices. The image acquisition device is configured to illuminate a subject with structured light using a light source array that includes multiple light sources disposed in a predetermined pattern, and capture an image of the subject as illuminated by the structured light. The image analysis engine is configured to determine that the image includes features representative of the predetermined pattern, and in response, identify the subject in the image to be an alternative representation of a live person. The image analysis engine is further configured to prevent, responsive to identifying the subject in the image to be an alternative representation of a live person, an access to the secure system. In some implementations, the image analysis engine works in communication and/or conjunction with an authentication engine to prevent the access to the secure system.

In another aspect, this document features one or more machine-readable storage devices encoded with instructions configured to cause one or more processing devices to execute various operations. The operations include causing a light source array to illuminate a subject with structured light, wherein using the light source array includes multiple light sources disposed in a predetermined pattern, and receiving an image of the subject captured under illumination by the structured light. The operations also include determining that the image includes features representative of the predetermined pattern, and in response, identifying the subject in the image to be an alternative representation of a live person. The operations further include, responsive to identifying the subject in the image to be an alternative representation of a live person, preventing access to the secure system.

Implementations of the above features can include one or more of the following features.

The alternative representation of a live person can include a photograph of the live person that is printed on paper, or presented on a display device. Determining that the image includes features representative of the predetermined pattern includes computing a frequency domain representation of the image, determining that an amount of energy in a target frequency range is higher than a threshold, and in response, determining that the image includes features representative of the predetermined pattern. The threshold can be substantially equal to 60% of energy content of the frequency domain representation of the image. The light source array can be configured to radiate infrared (IR) illumination. Determining that the image includes features representative of the predetermined pattern can include processing the image using a machine learning process trained to discriminate between images of live persons and corresponding alternative representations of the live persons. The frequency domain representation can include, for example, a two-dimensional Fast Fourier Transform (2D-FFT) of the image, or a wavelet-based decomposition of the image. A determination may be made that the image does not include features representative of the predetermined pattern, and in response, the subject in the image can be identified to be a live person. Responsive to identifying the subject in the image to be a live person, an authentication process for determining if the live person is authorized to access the secure system can be initiated. The secure system can include a user-interface disposed in a kiosk. The light source array can be disposed on the kiosk.

Various implementations described herein may provide one or more of the following advantages. Reliability and/or security of a biometric authentication system can be improved by allowing the system to discriminate between live persons and alternative representations such as photographs displayed on paper or display devices. By allowing a biometric authentication system to discriminate between an image of a live person and an image of a spoof alternative representation, additional processing can be preemptively terminated, thereby creating an additional layer of security. In some cases, where a camera and a structured light source is also used for obtaining high quality biometric images (e.g., an eye-print), the technology described herein allows for implementing a spoof detection system while reducing requirements for additional hardware. This in turn in some cases, can reduce costs associated with the underlying biometric authentication system.

Figure 1:
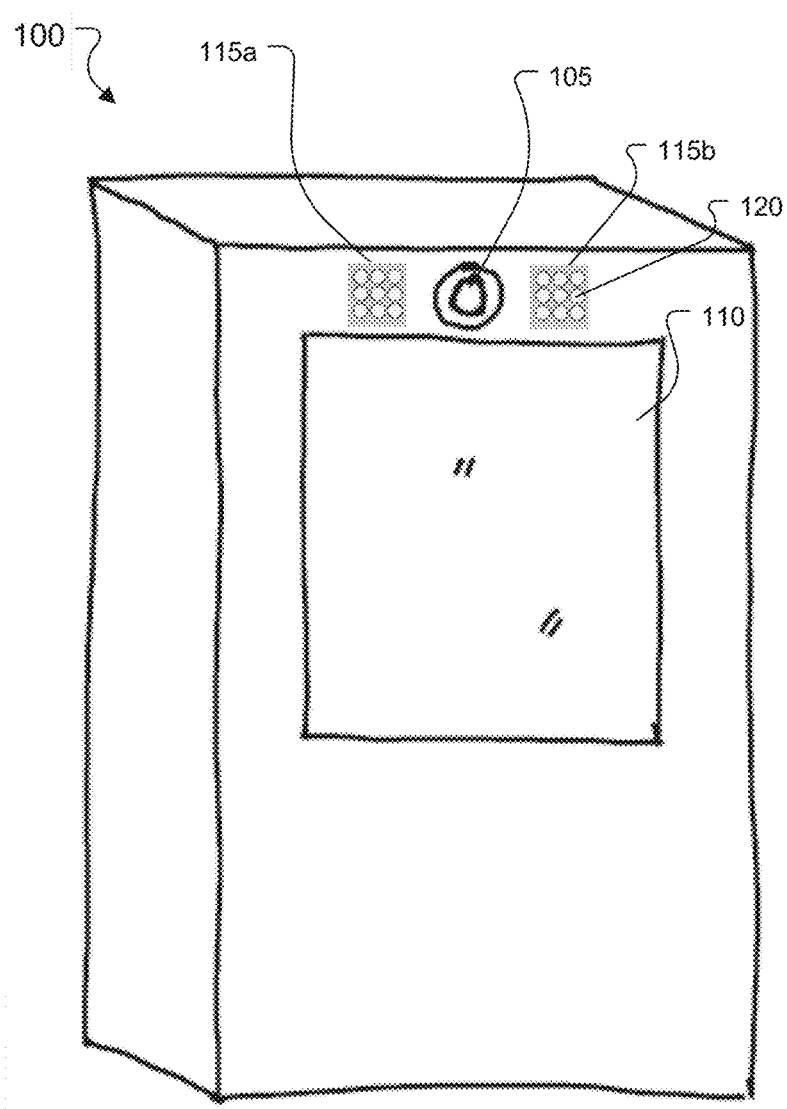
FIG. 1 shows a kiosk machine as an example environment in which the technology described herein may be used.

Repeat use of reference characters in the present specification and drawings is intended to represent same or analogous features or elements.

DETAILED DESCRIPTION

This document presents an image analysis method in which an image captured using an image acquisition device of a biometric authentication system is analyzed to determine if the image corresponds to an actual live person, or to an alternative representation (e.g., a photograph or other image of the live person printed on paper, or displayed on a high definition display device) of the live person. If the captured image is not determined to correspond to a live person, any further processing of the captured image by the biometric authentication system can be stopped, and any corresponding access attempt can be prevented immediately. Many biometric authentication systems involve authenticating a user to a secure system based on recognizing the user's face, eye-print, iris etc. Such biometric authentication systems involve capturing one or more images of a user, and executing corresponding recognition processes on the captured image. Malicious attempts to breach the security of such biometric authentication systems can include presenting an alternative representation of a live person to gain access to an account or other privileges associated with the identity of the corresponding live person. Such attacks are generally known as spoof attacks, and the reliability/security of a biometric authentication system can be determined by the ability of the system to differentiate between a live person and corresponding alternative representations (also referred to as spoofs). The technology described herein improves security/reliability of biometric authentication systems that rely on recognizing a user based on face recognition, eye-print recognition, iris recognition etc. Specifically, this document describes preprocessing steps that allow for determining whether the captured image corresponds to an actual live person or a spoof alternative representation such as a printed or displayed image/photograph of the live person. Upon detecting that the captured image is a spoof, any further processing of the image to allow access to the corresponding secure system can be prevented, thereby adding an added layer of security to the system.

FIG. 1 shows a kiosk machine 100 as an example environment in which the technology described herein may be used. Such kiosk machines may be used for various purposes that require authenticating users via one or more biometric authentication processes. For example, the kiosk 100 can include an automated teller machine (ATM) that allows a user to withdraw money from a bank account. In another example, the kiosk 100 may be deployed at a restaurant or a fast-food outlet, and allow a user to order and pay for food. The kiosk 100 may also be deployed at an entry point (e.g., at the gate of an arena or stadium) to authenticate entrants prior to entering the venue. In general, the kiosk 100 may be deployed at various types of locations to authenticate users interactively, or even without any active participation of the user.

In some implementations, the kiosk 100 can include one or more components that support a biometric authentication system. For example, the kiosk 100 can include a camera 105 that captures images of users interacting with the kiosk 100. The captured images may be processed to identify/authenticate valid users, and/or permit or deny access to the services/products being offered through the kiosk. For example, the kiosk 100 may include a display device 110 (e.g., a capacitive touch screen) that allows a user to select and order food at a retail outlet. Once the user completes the selection via user-interfaces presented on the display device 110, the user may be asked to look towards the camera 105 for authentication. The images captured using the camera 105 may then be used to authenticate/identify/verify a pre-stored profile for the user, and the payment for the food may then be automatically deducted from an account linked to the profile.

In some implementations, the images captured using the camera 105 can be processed using an underlying biometric authentication system to identify/verify the user. In some implementations, the biometric authentication system may extract from the images, various features—such as features derived from the face, iris, vasculature underlying the sclera of the eye, or the periocular region—to identify/authenticate a particular user based on matching the extracted features to that of one or more template images stored for the user during an enrollment process. The biometric authentication system may use a machine-learning process (e.g., a deep learning process implemented, for example, using a deep neural network architecture) to match the user to one of the many templates stored for various users of the system. In some implementations, the machine learning process may be implemented, at least in part, using one or more processing devices deployed on the kiosk 100. In some implementations, the kiosk 100 may communicate with one or more remote processing devices (e.g., one or more remote servers) that implement the machine learning process.

In some implementations, the images captured using the camera 105 are used to authenticate/identify/verify a user, and provide access to accounts/privileges associated with the identity of the user. For example, one or more images captured by the camera 105 can be analyzed to recognize a user (e.g., using face recognition, eye-print recognition, iris recognition etc.) using a corresponding underlying biometric authentication process. However, malicious attempts to breach the security of such biometric authentication processes often involve presentation of an alternative representation of a live person (e.g., photograph or other image of the live person printed on paper, or displayed on a high definition display device) in an attempt to cause the underlying biometric authentication system to identify the alternative representation as the corresponding live person. Therefore, in many cases, the security and/or reliability of the underlying biometric authentication system depends on the ability of the system to discriminate between actual live persons and spoof alternative representations such as printed photographs or images displayed on display devices. The technology described herein allows for improving the discrimination capabilities of biometric authentication systems, thereby improving reliability/security of the systems.

In some implementations, the kiosk 100 can include one or more illumination sources 115a and 115b (115, in general) configured to generate electromagnetic radiation for illuminating the subject of the images being captured by the camera 105. For example, the illumination sources 115 can each include a light source array that includes one or more light sources 120 (e.g., light emitting diodes (LEDs), laser sources, etc.) that are arranged in a particular pattern. In the example of FIG. 1, each illumination source 115 includes a light source array of nine LEDs arranged in three rows of three LEDs each. However, the light sources or LEDs may be arranged in various other patterns including, for example, patterns of concentric circles. In some implementations, a light source 115 can include a projector having a pattern of point light sources such as laser sources or other sources capable of producing narrow beams of light. While FIG. 1 shows two spatially separated light sources 115a and 115b, a single light source 115 may also be used.

Figure 2A:
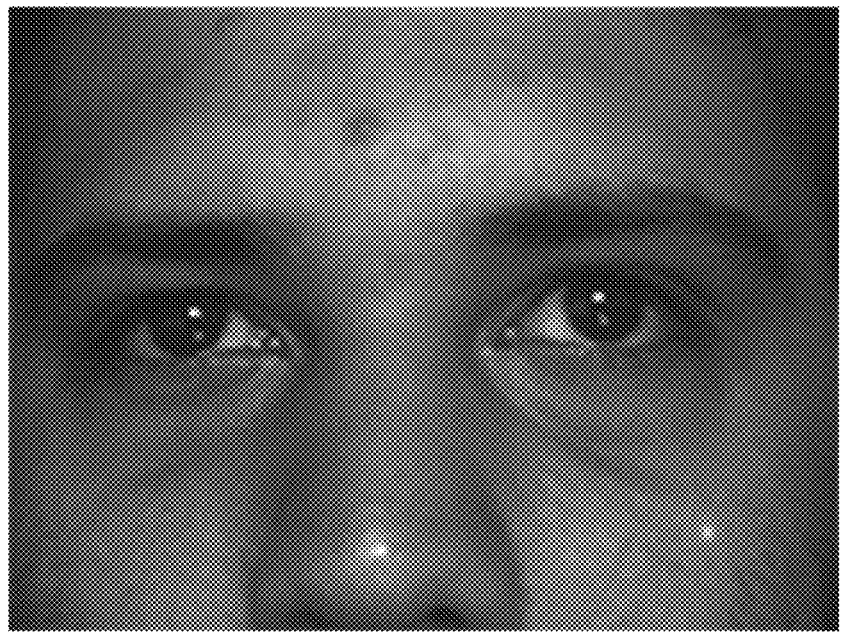
FIG. 2A shows an example of an image of a live person captured under structured light illumination.
Figure 2B:
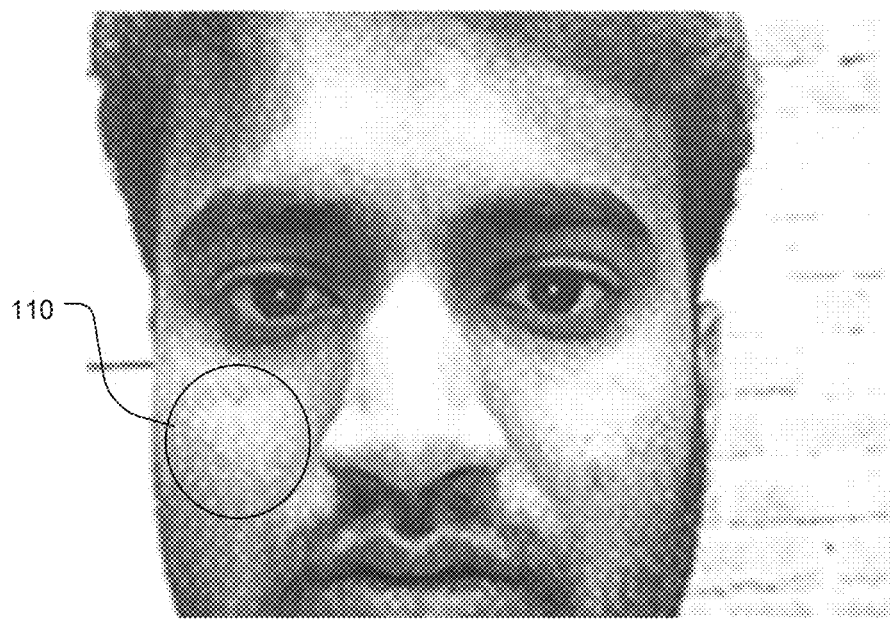
FIG. 2B shows an example of an image of an alternative representation of a live person—a photograph printed on paper—captured under structured light illumination

The illumination sources 115 are configured to illuminate the subject with a corresponding pattern of illumination. The pattern of illumination can be referred to as structured light, and configured to introduce high frequency components into images that do not correspond to that of a live person. The skin of a live person scatters and absorbs light incident on it. Therefore, even when structured light, such as that radiated by a pattern of LEDs, is incident on human skin, the light is scattered internally and reflected as diffused light such that a representation of the pattern is not easily detected in an image of the live person captured by the camera 105. On the other hand, if the camera 105 captures an image of a photograph of the person printed on paper, a representation of the pattern may be detectable in the image, for example, due to specular reflection and/or lack of scattering and diffusion. This is illustrated in FIGS. 2A and 2B, which show an example of an image of a live person and an example of an image of a photograph printed on paper, respectively. As seen in FIG. 2B (for example, within the circular area 210), the image of the photograph printed on paper includes a representation of the pattern of the structured light source in the form of high-frequency dots. However, as illustrated by FIG. 2A, an image of a live person does not include any such representation of the pattern. In case the alternative representation of a live person is presented on a display device (e.g., a LCD display), imaging the display device under IR illumination causes the display device to absorb the IR radiation, and appear substantially black in an image captured by the camera 105. These differences can be leveraged to discriminate between images of live persons and images of alternative representations of live persons using the technology described herein.

In some implementations, the illumination sources 115 can be configured to radiate electromagnetic radiation in the infrared (IR) wavelength range. In some implementations, an illumination source includes an infrared projector disposed inside a depth sensing camera, wherein the projector projects a dotted pattern of illumination on the target. In some implementations, the wavelength ranges radiated by the illumination sources 115 can include, for example, the IR spectrum (e.g., 700-1400 nm). Because skin reflectance drops at around 940 nm due to absorption by oxygenated hemoglobin, and above 1100 nm due to absorption by water/blood, in some implementations, the illumination sources 115 can be configured to radiate electromagnetic radiation in the 850-940 nm range. While the example in FIG. 1 shows two illumination sources 115 that are physically separated along a horizontal direction, more or fewer illumination sources 115 may also be used. In some implementations, the illumination wavelength can be selected, for example, such that a scattering of light of the selected wavelength is significantly different for human skin than that for paper, display or another surface that may be used for presenting a spoof alternative representation. Operating principles of obtaining images using structured light depth cameras are well known, and discussed, for example, in Chapter 2 of the book: "Time-of-Flight and Structured Light Depth Cameras—Technology and Applications," Zanuttigh et. al., ISBN: 978-3-319-30971-2, the content of which is incorporated herein by reference.

FIG. 3 shows an example system 300 for analyzing images captured under structured light illumination to determine if the images are of live persons or spoof alternatives of live persons. The system 300 includes an image acquisition device 305 configured capture images of subjects. In some implementations, the image acquisition device 305 includes a camera substantially similar to the camera 105 described with reference to FIG. 1. The image acquisition device 305 can also include a structured light source such as a light source array including multiple light sources disposed in a particular pattern. In some implementations, the structured light source associated with the image acquisition device 305 can be substantially similar to the illumination sources 115 described above with reference to FIG. 1. Other light sources generating structured light can also be used. In some implementations, the image acquisition device 305 includes an IR camera and one or more IR light source array configured to illuminate a subject during image capture by the IR camera. In some implementations, the image acquisition device includes one or more processing devices configured to generate digital data from the captured images.

The system 300 also includes an image analysis engine 310 that can be configured to analyze images captured by the image acquisition device 305. In some implementations, the image analysis engine 310 is configured to receive digital representations of images captured by the image acquisition device 305 and determine whether or not the images correspond to that of a live person. In some implementations, the image analysis engine 310 includes an analog to digital converter (ADC) to generate digital image data from information (e.g., sensor output) received from the image acquisition device 305. The image analysis engine includes one or more processing devices configured to execute various image analysis processes, including the processes described herein.

In some implementations, the image analysis engine 310 may reside on a computing device (e.g., a server) that is at a remote location with respect to the image acquisition device and/or the authentication engine 315. For example, the image acquisition device 305 can be disposed at a kiosk 100 that communicates over a network with a remote server on which the image analysis engine 310 executes. The image analysis engine 310 can in turn provide an output of the analysis to the authentication engine 315 residing on the kiosk 100. In some implementations, the authentication engine 315 can also reside on a remote server (e.g., the same server one which the image analysis engine 310 resides, or on a different server) and communicate the result of an authentication process to the kiosk 100.

The image analysis engine 310 can be configured to analyze the captured images in various ways, in order to determine whether or not the captured images correspond to a live person. In some implementations, the image analysis engine 310 can be configured to compute a frequency domain representation (e.g., a two dimensional Fast Fourier Transform (2D FFT), a discrete cosine transform (DCT), a wavelet transform etc.) of an image to determine whether the image includes a representation of the pattern associated with the corresponding structured light source. For example, the image analysis engine 310 can be configured to determine what percentage of the energy content of the image is in a high frequency region, and determine based on that percentage, whether or not the image includes a representation of the pattern. Referring back to FIG. 2B, an image of a spoof alternative representation is likely to include dots that are representative of the pattern of the corresponding light source array, and this in turn results in a high percentage of high frequency components in the frequency domain representation of the image. On the other hand, as illustrated by FIG. 2A, the pattern of the structured light source is far less represented in an image of a live person, and the corresponding frequency domain representation of such an image is likely to have a relatively low percentage of high frequency components. The threshold percentage used to determine whether or not an image is that of a live person can depend on various factors, including for example, presence of high frequency components in the image that are not attributable to the structured light source.

Figure 3A:
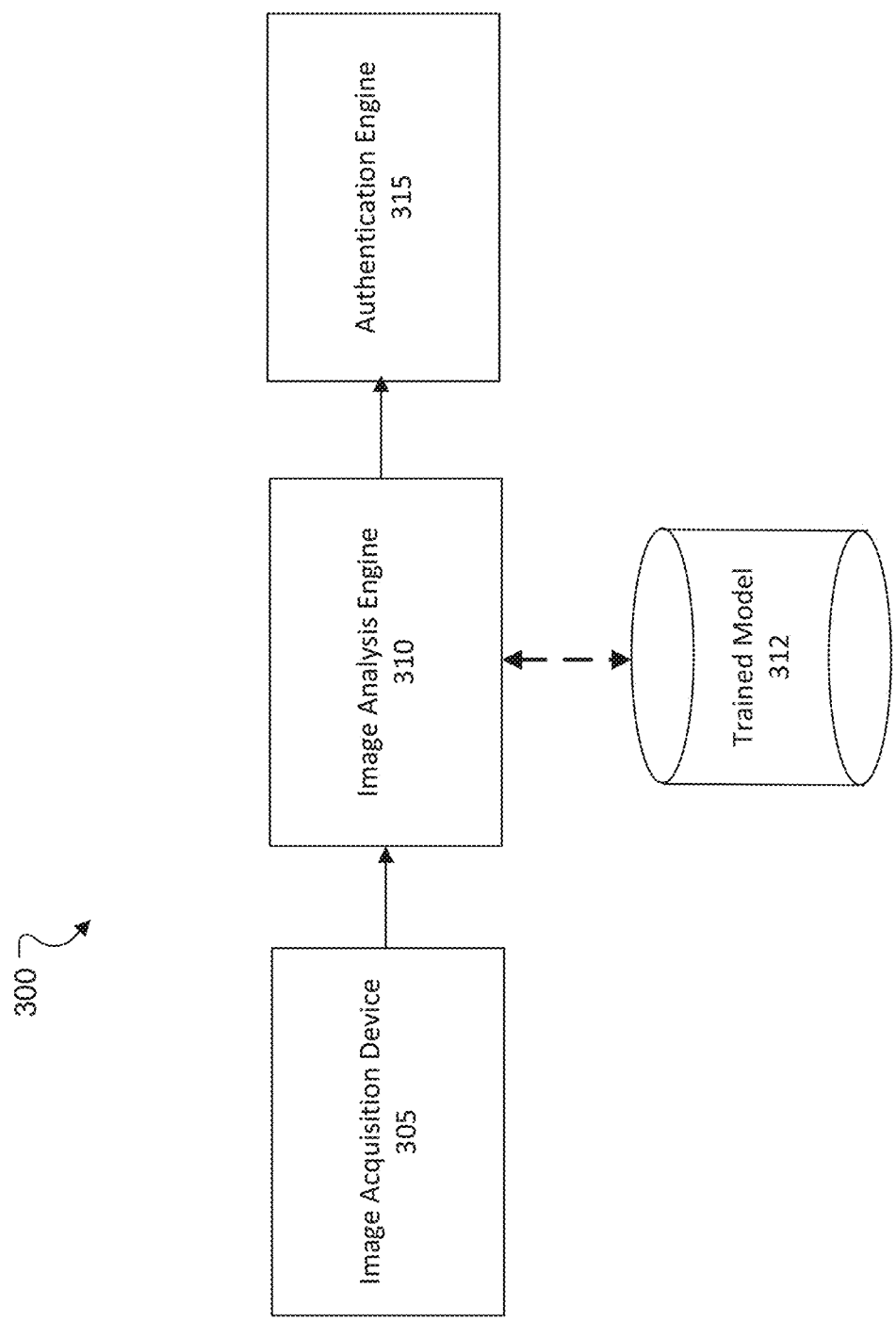
FIG. 3A is a block diagram of an example system usable for implementing the technology described herein.
Figure 3B:
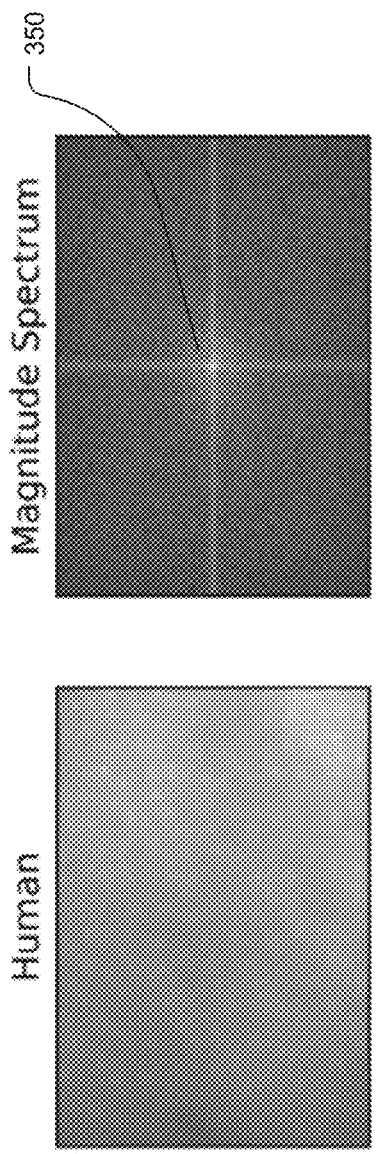
FIGS. 3B and 3C show examples of images and corresponding frequency domain representations obtained using the example system of FIG. 3A.
Figure 3C:
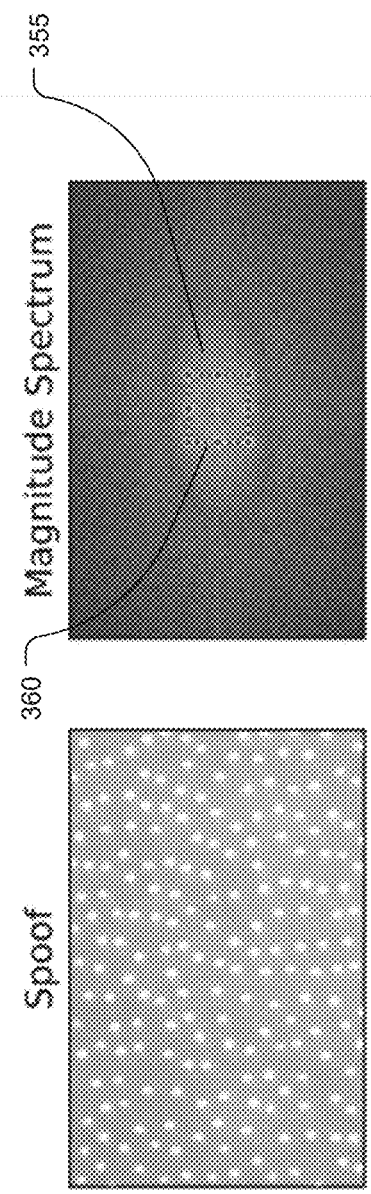

In some cases, the threshold percentage can be empirically determined based on comparing frequency contents of images of live persons and images of spoof alternative representations of live persons. In some implementations, the threshold is selected as 60%, such that an image is flagged as spoof if more than 60% energy of the image is in the high frequency spectrum. This is illustrated with the examples shown in FIGS. 3A and 3B. Specifically, FIG. 3A shows the image of structured light as captured from a human subject, and the magnitude spectrum of a corresponding frequency domain representation. FIG. 3B shows the image of a spoof alternative representation under structured light illumination, and the magnitude spectrum of the corresponding frequency domain representation. As seen from FIG. 3B, the clustering of low-grayscale values in the region 350 near the center of the frequency domain representation indicates that the energy of the image is mostly in the low frequency regions of the frequency domain representation. On the other hand, as seen from FIG. 3C, the energy of the image is spread out into the region 355 that includes higher frequencies. Such differences in the distribution of the image energy can be used to determine whether an image is that of a live person or not. For example, a low frequency region 360 can be defined, for example, to cover 20% range of each axis in the low frequency region. The energy inside and outside of such a low frequency region can then be calculated and compared to determine whether a threshold amount of energy is in the high-frequency regions of the frequency domain representation. For example, for a 60% threshold, an image can be determined to be that of a spoof alternative representation if 60% of the total image energy lies outside the region 360. The extent, shape, or other parameters of the region 360 can be experimentally determined, for example, based on nature of the images.

In some implementations, the image analysis engine 310 can be configured to execute a machine learning process to discriminate between images of a live person and images of alternative representations of live persons. In such cases, the image analysis engine can access a trained model 312, which has been trained using a learning corpus that includes both types of images. In some implementations, using a machine learning process may improve the performance of the image analysis engine 310 by reducing the false positive rate and/or the false negative rate. In some implementations, the trained model 312 can be trained to account for spoofs presented on various types of papers and display devices.

Figure 4:
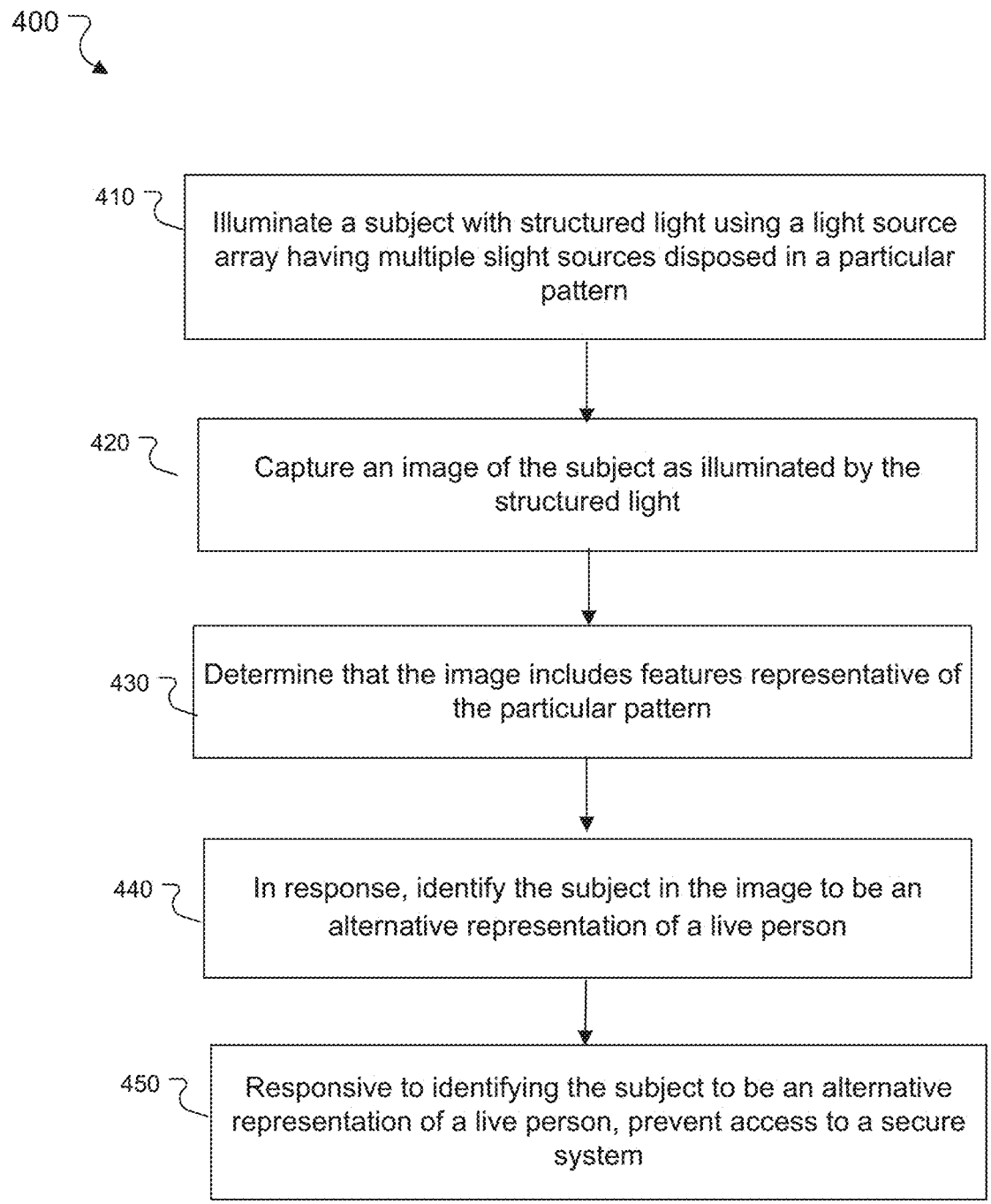
FIG. 4 is a flowchart of an example process for preventing access to a secure system based on determining a captured image to be of an alternative representation of a live person.

FIG. 4 is a flowchart of an example process for preventing access to a secure system based on determining a captured image to be of an alternative representation of a live person. In some implementations, at least a portion of the process 400 may be executed by one or more processing devices disposed within a kiosk such as the kiosk 100 described with reference to FIG. 1. In some implementations, at least a portion of the process 400 may be executed by the image analysis engine 310, which may be disposed within a kiosk, or at one or more servers (such as servers or computing devices in a distributed computing system) in communication with remote components such as one or more processing devices disposed within a kiosk.

Operations of the process 400 includes illuminating a subject with structured light using a light source array comprising multiple light sources disposed in a predetermined pattern (410). The light source array can be disposed, for example, as a part of the illumination source 115 as described above with reference to FIG. 1. In some implementations, the light source array can be disposed in another device such as a smartphone, wherein the spoof detection process described herein is used to prevent unauthorized access to the smartphone. In some implementations, the light source array is configured to radiate IR illumination.

Operations of the process 400 also includes capturing an image of the subject as illuminated by the structured light (420). In some implementations, the image can be captured using an image acquisition device substantially similar to the image acquisition device 305 described above with reference to FIG. 3. In some implementations, the image acquisition device can be disposed as a part of a kiosk 100 as described above with reference to FIG. 1. In some implementations, the image acquisition device can be disposed in a smartphone.

Operations of the process 400 further includes determining that the image includes features representative of the predetermined pattern (430), and in response identifying the subject in the image to be an alternative representation of a live person (440). The alternative representation of a live person can include a photograph of the live person. The photograph can be printed on paper, or displayed on a display device such as the screen of a mobile device. Determining that the image includes features representative of the predetermined pattern can include computing a frequency domain representation of the image, determining that an amount of energy in a high-frequency range is higher than a threshold, and in response, determining that the image includes features representative of the predetermined pattern. In some implementations, the threshold is substantially equal to 60% of energy content of the frequency domain representation of the image. In some implementations, the frequency domain representation can include a two-dimensional Fast Fourier Transform (2D-FFT) of the image, or another transform such as a wavelet-based decomposition or a DCT. In some implementations, determining that the image includes features representative of the predetermined pattern comprises processing the image using a machine learning process trained to discriminate between images of live persons and corresponding alternative representations of the live persons (e.g., images of photographs or display devices showing photographs of live persons)

Operations of the process 400 also includes preventing, responsive to identifying the subject in the image to be an alternative representation of a live person, access to the secure system (450). In some implementations, where a user-interface of the secure system is disposed as a part of a kiosk, identifying a captured image to be a spoof can prevent an access attempt made through the kiosk. On the other hand, if a determination is made that the image does not include features representative of the predetermined pattern, the subject in the image can be identified as a live person, and an authentication process for determining if the live person is authorized to access the secure system is initiated. This can be done, for example, using an authentication system substantially similar to the authentication engine 315 described above with reference to FIG. 3. If such an authentication engine authenticates the live person to access the secure system (e.g., a user account or privileges associated with the access attempt), the live person is allowed to continue the interaction with the corresponding user interface (e.g., a kiosk or a smartphone).

Figure 5:
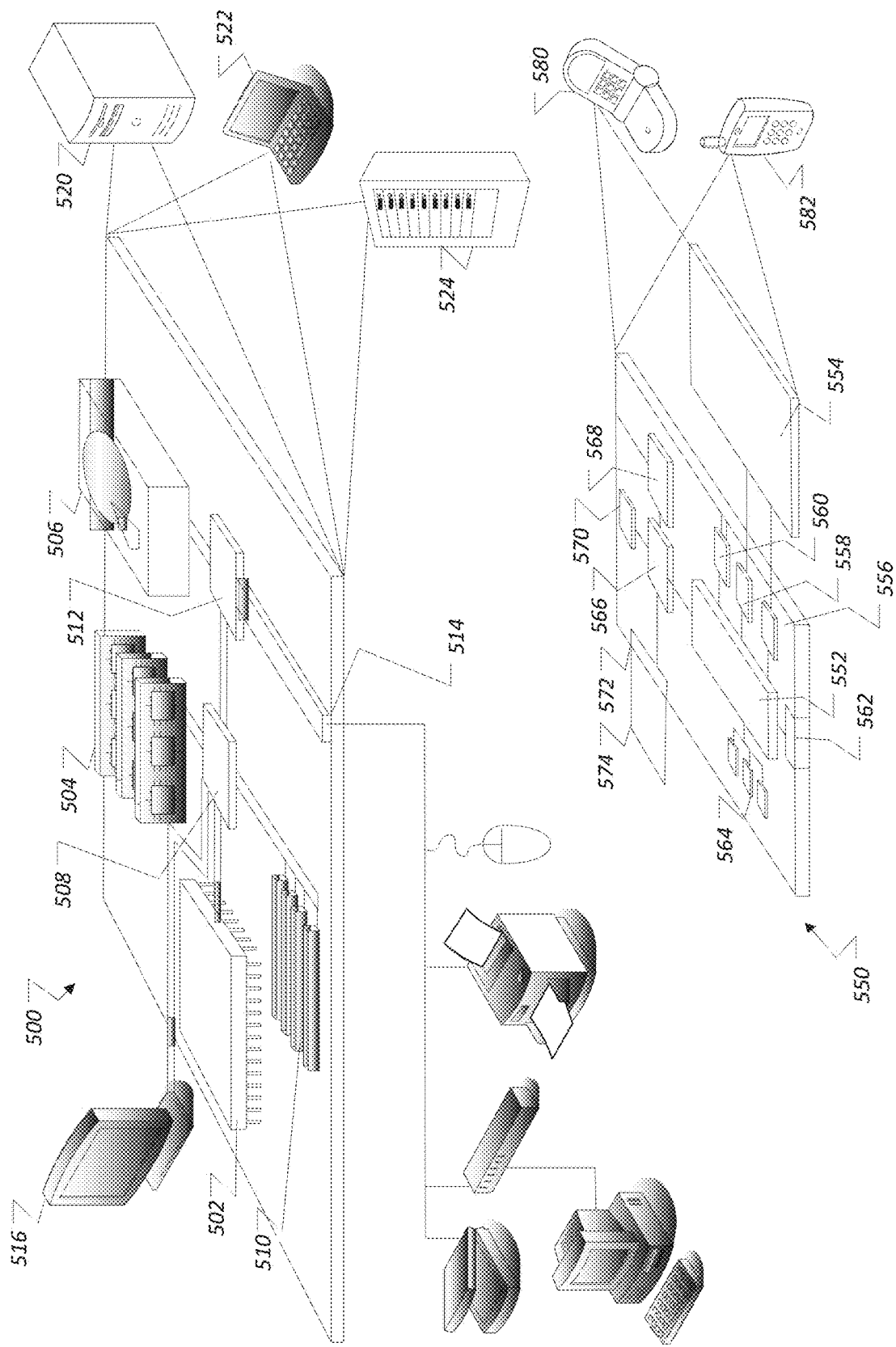
FIG. 5 is a block diagram representing examples of computing devices.

FIG. 5 shows an example of a computing device 500 and a mobile device 550, which may be used with the techniques described here. For example, referring to FIG. 1, the kiosk device 100 can include one or more of the computing device 500 or the mobile device 550, either in part or in its entirety. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, and so forth) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A method for preventing access to a secure system based on determining a captured image to be of an alternative representation of a live person, the method comprising:
    illuminating a subject with structured light using a light source array comprising multiple light sources disposed in a predetermined pattern;
    capturing an image of the subject as illuminated by the structured light;
    detecting that the image includes a reflection of the predetermined pattern;
    responsive to detecting that the image includes a reflection of the predetermined pattern, identifying the subject in the image to be an alternative representation of a live person comprising a photograph of the live person printed on paper or displayed on a screen: and
    responsive to identifying the subject in the image to be an alternative representation of a live person, preventing access to the secure system.

2. The method of claim 1, wherein the alternative representation of a live person comprises a photograph of the live person.

3. The method of claim 2, wherein the photograph is printed on paper, or presented on a display.

4. The method of claim 1, wherein determining that the image includes features representative of the predetermined pattern comprises:
computing a frequency domain representation of the image;
determining that an amount of energy in a target frequency range is higher than a threshold; and
responsive to determining that the amount of energy in the target frequency range higher than the threshold, determining that the image includes features representative of the predetermined pattern.

5. The method of claim 4, wherein the threshold is substantially equal to 60% of energy content of the frequency domain representation of the image.

6. The method of claim 4, wherein the frequency domain representation comprises one of: a two dimensional fast Fourier transform (2D-FFT) of the image or a wavelet-based decomposition of the image.

7. The method of claim 1, wherein the light source array is configured to radiate infrared (IR) illumination.

8. The method of claim 1, wherein determining that the image includes features representative of the predetermined pattern comprises processing the image using a machine learning process trained to discriminate between images of live persons and corresponding alternative representations of the live persons.

9. The method of claim 1, further comprising:
determining that the image does not include features representative of the predetermined pattern;
responsive to determining that the image does not include features representative of the predetermined pattern, identifying the subject in the image to be a live person; and
responsive to identifying the subject in the image to be a live person, initiating an authentication process for determining if the live person is authorized to access the secure system.

10. The method of claim 1, wherein the secure system comprises a user-interface disposed in a kiosk, and the light source array is disposed on the kiosk.

11. A secure system comprising:
an image acquisition device configured to:
illuminate a subject with structured light using a light source array comprising multiple light sources disposed in a predetermined pattern, and
capture an image of the subject as illuminated by the structured light; and
an image analysis comprising one or more processing devices, the image analysis engine configured to:
determine that the image includes features representative of the predetermined pattern;
responsive to determining that the image includes features representative of the predetermined pattern, identify the subject in the image to be an alternative representation of a live person; and
responsive to identifying the subject in the image to be an alternative representation of a live person, prevent access to the secure system.

12. The system of claim 11, wherein the alternative representation of a live person comprises a photograph of the live person.

13. The system of claim 12, wherein the photograph is printed on paper, or presented on a display device.

14. The system of claim 11, wherein determining that the image includes features representative of the predetermined pattern comprises:
computing a frequency domain representation of the image;
determining that an amount of energy in a target frequency range is higher than a threshold; and
responsive to determining that the amount of energy in the target frequency range higher than the threshold, determining that the image includes features representative of the predetermined pattern.

15. The system of claim 14, wherein the threshold is substantially equal to 60% of energy content of the frequency domain representation of the image.

16. The system of claim 11, wherein the light source array is configured to radiate infrared (IR) illumination.

17. The system of claim 14, wherein the frequency domain representation comprises one of: a two-dimensional Fast Fourier Transform (2D-FFT) of the image or a wavelet-based decomposition of the image.

18. The system of claim 11, wherein determining that the image includes features representative of the predetermined pattern comprises processing the image using a machine learning process trained to discriminate between images of live persons and corresponding alternative representations of the live persons.

19. The system of claim 11, wherein the image analysis engine is configured to:
determine that the image does not include features representative of the predetermined pattern;
responsive to determining that the image does not include features representative of the predetermined pattern, identify the subject in the image to be a live person; and
responsive to identifying the subject in the image to be a live person, initiate an authentication process for determining if the live person is authorized to access the secure system.

20. One or more machine-readable storage devices encoded with instructions configured to cause one or more processing devices to execute operations comprising:
causing a light source array to illuminate a subject with structured light, wherein using the light source array includes multiple light sources disposed in a predetermined pattern;
receiving an image of the subject captured under illumination by the structured light;
determining that the image includes features representative of the predetermined pattern;
responsive to determining that the image includes features representative of the predetermined pattern, identifying the subject in the image to be an alternative representation of a live person; and
responsive to identifying the subject in the image to be an alternative representation of a live person, preventing access to the secure system.

* * * * *